(12) United States Patent
Lewis

(10) Patent No.: US 6,953,500 B2
(45) Date of Patent: Oct. 11, 2005

(54) WATER WAX EMULSION CLEANER AND WAXER

(76) Inventor: Glenn H. Lewis, 1405 Carol St., Park Ridge, IL (US) 60068

( * ) Notice: Subject to any disclaimer, the term of this patent is extended or adjusted under 35 U.S.C. 154(b) by 0 days.

(21) Appl. No.: 10/230,047

(22) Filed: Aug. 28, 2002

(65) Prior Publication Data

US 2003/0075077 A1 Apr. 24, 2003

Related U.S. Application Data

(60) Provisional application No. 60/318,435, filed on Sep. 10, 2001.

(51) Int. Cl.$^7$ ................................................. C09G 1/04
(52) U.S. Cl. .............................. 106/3; 106/10; 106/271
(58) Field of Search ............................... 106/3, 271, 10

(56) References Cited

U.S. PATENT DOCUMENTS

| | | | |
|---|---|---|---|
| 2,626,870 A | * | 1/1953 | Cooke et al. .................. 106/10 |
| 3,929,492 A | | 12/1975 | Chapman et al. |
| 3,971,733 A | | 7/1976 | Hawkins |
| 4,218,250 A | | 8/1980 | Kasprzak |
| 4,354,871 A | * | 10/1982 | Sutton ............................ 106/3 |
| 4,404,035 A | | 9/1983 | Ona et al. |
| 4,732,612 A | | 3/1988 | Steer et al. |
| 5,017,222 A | | 5/1991 | Cifuentes et al. |
| 5,141,555 A | | 8/1992 | Elepano |
| 5,261,951 A | | 11/1993 | Sejpka et al. |
| 5,296,166 A | | 3/1994 | Leong |
| 5,330,787 A | | 7/1994 | Berlin et al. |
| 5,397,384 A | | 3/1995 | Wisniewski |
| 5,503,755 A | | 4/1996 | Danner |
| 5,700,312 A | | 12/1997 | Fausnight et al. |
| 2003/0167963 A1 | * | 9/2003 | Bedford et al. ................. 106/3 |

* cited by examiner

*Primary Examiner*—C. Melissa Koslow
(74) *Attorney, Agent, or Firm*—Eugene F. Friedman

(57) ABSTRACT

Water based waxing mixtures for protecting surfaces providing ionically neutral ingredients adhering to the surface while repelling environmental impurities, such as dirt. Surface precleaning need not precede the wax application because of an exchange, which takes place between the mixture and surface dirt. The mixture constitutes an emulsion of an organic phase in an aqueous phase. The aqueous phase amounts to 70 percent to 92 percent by weight, while the organic phase provides the remainder of the mixture and contains suspended waxes. The organic phase includes natural waxes, silicone compounds, nonionic emulsifiers and suspending agents. The mixture may be applied to wet or dry surfaces in shade or bright sunlight and then wiped off to leave a durable shine. The compound finds use on painted, polished, or smooth texture surfaces such as on an automobile. Surfactants and suspending agents stabilize the phase ingredients to allow suspension of the wax in the water. Softening agents both smooth and stabilize the consistency of the wax.

93 Claims, No Drawings

WATER WAX EMULSION CLEANER AND WAXER

CROSS REFERENCE TO RELATED APPLICATION

The benefit of the filing date of U.S. provisional patent application serial No. 60/318,435, filed Sep. 10, 2001, is claimed for the present application.

BACKGROUND

Waxes and other surface enhancement compositions seek to protect surfaces, most commonly found on today's automobiles, from external harmful sources. Additionally, waxes enhance the surface appearance producing a pleasing shine and luster. Once applied, wax coats each surface forming a protective layer above the surface. The wax film repels most harmful environmental conditions such as weather, road salts, and dirt, thus protecting the surface finish beneath. Currently, the first step before the application of wax to any surface entails thoroughly cleaning the surface. Wax does not bond as well to a dirty surface as to a cleaned surface. Waxing a dirty surface creates a nonaesthetic finish which is harmful to the integrity of the paint by trapping caustic or reactive contaminants next to the paint. Dirt particles possess a platelet structure. On a surface, these platelets arrange themselves to create a positive highly charged surface field which accelerates the degradation of the paint. Further corrosive actions of grease, grime and caustic particulates such as acid rain also take place on the dirty surface. Thus, waxing an unclean surface results in an uneven wax distribution on the surface that looks worse and provides less than optimal protection to the waxed surface. This is not the case for clean surfaces.

Clean surfaces are essentially uncharged and nonpolar. Wax adheres to clean surfaces because waxes are also nonpolar and noncharged by their nature. As the wax is applied, it coats and recoats the surface until an optimum wax thickness is achieved.

Normally, the best protection occurs with a maximum wax thickness on the surface. Over time, environmental conditions wear down the wax surface coating. Particulates in the air combine with rainwater, wind, and other elements to act as an abrasive and break down the wax, thus exposing the surface. Thus, placing more wax on the surface increases its resistance to environmental conditions. Consequently, wax makers seek chemical means to attach greater amounts of wax to a surface. This goal is achieved by improving wax bonding and stability. A variety of techniques accomplishes bonding enhancement and stability. First, wax compositions include chemical bonding agents added to the wax to enhance adhesion to the surface.

Second, waxes may contain microabrasives to increase the wax's holding power. Micro abrasives interlock wax layers in an effort to increase the total thickness of the wax.

Third, wax formulations attempt to decrease their viscosity in order to reduce the thicker surface tension of waxed surfaces and enhance wax flow. Fourth, making a wax paste composition creates a thicker wax buildup on the surface.

Each of these methods seeks to increase the surface wax thickness of the wax mixture. Yet, each is limited by the quality of the wax-to-surface and wax-to-wax adhesiveness.

The current methods of wax application seek to force as much wax onto the substrate as the wax and surface will hold. This overloading relies on rubbing the wax onto the surface in large quantities. Further, to optimize overloading, wax makers recommend application under specific, limited conditions such as cool, shady, and dry weather. As the waxing process continues and upon reaching the overloading limit, the wax dries leaving a film residue of excess, nonadhered wax to remove. Buffing off the residue allows the wax that adheres to the surface to remain. The powdery residue which is released from the surface during buffing consists of the material that overloads the surface and exceeds the wax-loading capacity. The wax loading capacity and concomitantly resulting residue thus depends on the surface properties. For example, a rougher surface can hold more wax than a smoother surface. Thus, optimizing the wax adherence to the surface results from the wax stability and the surface's ability to hold the wax. The surface holding ability in turn, involves both the surface polarity as well as the degree of surface irregularities.

An automobile displays many dissimilar materials. For example, a car includes polished and painted metals, clean and painted plastics, rubber, glass, wood, vinyl, and leather, as well as combinations and hybrids of these. Each material possesses various surface compositions, textures and colors. As a result of this mix of surfaces, cleaning and polishing these materials to obtain the optimum performance and owner satisfaction pose unique challenges.

Waxing an exterior surface of an automobile composed of painted and unpainted, metallic, rubberized, plastic, vinyl, and glass surfaces involves different types of waxes, cleaners and effort. For example, formulations for plastic trim material will streak a glass windshield. A metal bodywaxing product may contain abrasives that if used on the windshield will scratch the glass. Thus, traditionally refurbishing a car's exterior required one compound for the body panels, a second mixture for the rubber, a third for the glass and yet a fourth for the plastic and vinyl trim.

Increased difficulties arise when waxing different surfaces, for example edge trim, that include combinations of materials such as strips of chrome, vinyl, and other plastic attached side-by-side. Wax formulations for one material can intermix with another creating undesired results. Therefore, various cleaning and polishing products must not mix with each other when working on different surfaces. For example, if the body-waxing compound makes contact with rubber or plastic an unsightly wax residue congeals on these surfaces. This residue takes significant effort to remove. Congealing occurs because these compounds contain waxes dissolved in organic solvents. The solvents in the wax react with the rubber or plastic producing the congealed residue.

Mixing different chemicals creates many dangerous side effects. For example, ammonia combined with certain chlorides creates highly toxic chlorine gas. The consumer does not always understand the warning labels on certain cleansers listing the hazards of mixing various materials. These dangers increase when label warnings include complex chemical names not easily understood.

Consumer use of organic solvents poses health and safety risks. These chemicals and organic solvents, when contacting exposed hands, can cause eye and skin irritations. To limit hand contact, most wax compounds recommend the use of plastic gloves. However, some solvents required to do a sufficient job of dissolving waxes in these formulas may in fact disintegrate the plastic gloves over repeated contacts. Thus, gloves provide limited protection.

In addition, each wax composition requires different applicators. A soft cloth used for polishing painted surfaces proves inadequate for a rubber tire, which instead requires a stiff bristle brush. Additionally, some wax compositions require multiple applications.

Traditional waxes typically require a two-step application even after thoroughly cleaning the surface. The first step applies the wax to the surface as a thick coating. The second step buffs excess dried wax from the surface.

Buffing the wax creates a reflective surface by smoothing and shaping the wax and effectively filling in surface irregularities. The wax becomes a kind of second skin to the surface. The dried excess wax on the surface turns to powdery dried wax particles. This powdery residue flakes off the surface, and easily becomes airborne which then can be inhaled or ingested. The particles may have biodegradable solvent by-products and pollute the environment. Airborne pollutants also prove dangerous to consumers and put small children, the elderly, those with existing heath problems, and pets at excessive risk. The best approach is to avoid substances that will create airborne particles.

Another serious environmental concern focuses on volatile organic compounds (VOCs). VOC's are organic compounds that remain active at one atmospheric pressure with low vapor pressure. Once created, VOC's do not biodegrade and forever remain pollutants. Although some cleaning compounds claim to have low levels of VOCs, even small amounts produce significant environmental concerns and over time pose health risks.

Further, most organic solvents are highly flammable and chemically abrasive. Additionally, VOC's can ignite when exposed to fire, heat or sunlight. A consumer may risk serious injury polishing a car on an extremely hot sunny day. VOC's can also damage painted surfaces and plastics by etching the finish.

Some products for differing automotive surfaces attempt to provide a solution However, multiuse compounds have limited utility for only similar surface types like painted surfaces, metallic surfaces, plastic and vinyl trim. For example, the exclusion of only glass makes a multiuse compound unsuitable. Significant physical effort and time are required to apply and buff different surfaces, even with multiple or multiuse waxing compounds.

Ordinarily, cleaning and polishing a car takes place out of doors. This makes weather a consideration. Further, to increase the surface coating stability, wax makers recommend that the application occur under dry, cool conditions and in the shade. This is because under hot sunlight, wax congeals too quickly and creates a thick wax coating which is difficult to buff and leaves an unappealing surface appearance. Further, some applications of some glass cleaners and waxes streak if applied in sunlight.

In the alternative, wax makers caution against applying during rain because the compound becomes too diluted to adhere to the surface. In fact, several waxes on the market specify that the application must take place when the relative humidity remains within a specified range.

Finally, temperature poses a problem in the application of some waxes. Excessively high and low temperatures alter the drying time and the viscosity of the cleaning and waxing materials. This results not only in a change in labor times but also effectiveness. Thus, wax behaves differently when applied in sunlight, low temperature, dry weather and high humidity. A remedy is a combination cleaner and wax that overcomes the difficulties of cleaning a car out of doors.

Thus, waxing today's automobiles poses significant challenges that demand a modern wax solution capable of coating any surface. These include painted surfaces, a painted metallic body, a wood dashboard, a rubberized element, a chrome component, a plastic trim strip, a vinyl strip, a glass headlight lens or a glass windshield without organic solvents and abrasives. The wax should also minimize health and safety concerns in a quick and effortless, single application.

SUMMARY

A water-based wax composition permits the cleaning and waxing of the various surfaces found on automobiles in a single step and with the same mixture. It can find use even when those surfaces exist in a wet state or have become heated in a bright, sunlight environment. This wax mixture provides an emulsion of an oil phase in a water phase. The emulsion includes the wax in its organic phase. The oil-in-water emulsion permits the application of the composition to the intended surfaces while they are wet. Subsequently wiping the surface gives a durable shine and luster. Thus, the application of the compound is not limited to weather conditions or time of day. This means that the compound can be applied on a summer day under full direct mid-day sunlight as effectively as on a winter evening during a heavy snowfall. Additionally, the composition possesses few, if any, organic solvents and VOCs.

The composition, or mixture, comprises an emulsion of at least two phases. The first, aqueous phase constitutes about 70 to 90 percent of the mixture weight. The organic phase provides the remaining approximately 10 to 30 percent of the mixture and includes a suspended wax. A softening agent for the wax in the organic phase maintains the wax in a condition that it may spread upon the desired surface. The mixture also contains a stabilizer to keep the two phases in emulsion with each other.

A somewhat modified, or at least more specific, formulation may include, in the aqueous phase, water constituting about 70 to 82 percent of the mixture's weight and a surfactant providing about 2 to 9 percent of the mixture. The surfactant maintains the dispersion of the two phases. The wax suspended in the organic phase comprises about 8 to 12.5 percent of the mixture's overall weight. The wax's softening agent provides a further 0.5 to 4 percent, approximately, of the mixture. Lastly, the mixture may contain no more than about 7 percent of a silicone liquid. The silicone, when present, aids in spreading the emulsion mixture over the desired surface and also yield a more durable finish than the wax alone.

The principles underlying the emulsion mixtures discussed above show that they may and will find use on a large variety of surfaces not associated with mn automobile. Initially, these can include aircraft surfaces. They then naturally extend to other areas where smooth surfaces appear. These can well include wood, ceramics, enamel, household appliances, ceramic tiles, ordinary windows. The utility of the compositions is only limited by the imagination.

A slightly modified formulation includes, in the aqueous phase, water constituting about 70 to 92 percent of the mixture; a suspending agent in an amount of about 0.1 to 0.65; and a surfactant in amount of about 1 to 9 percent and, in the organic phase, a suspended wax amounting to about 2 to 20 percent of the mixture; a softening agent in an mount of about 0.3 to 4 percent; a silicone liquid amounting to about 1 to 7 percent; and an emulsion stabilizer providing about 0.2 to 1 percent of the mixture. Another mixture presents the same ingredients in the same phases but in the following approximate weight amounts: water, 70 to 92 percent; a suspending agent, 0.3 to 4; a surfactant, 2 to 9 percent; a suspended wax, 2.5 to 20 percent; a softening agent, 0.3 to 4 percent; a silicone liquid, 1 to 2 percent; and an emulsion stabilizer, 0.2 to 0.3 percent. A slightly modified formula places a preservative, amounting to about 0.1 to 0.5 of the mixture weight, in the organic phase. The other ingredients then may have the following approximate weight portions: water, 71 to 87 percent; a suspending agent, 0.1 to 0.7; a surfactant, 1.5 to 12 percent; a suspended wax, 2 to 6 percent; a softening agent, 0.3 to 1 percent; a silicone liquid, 0.5 to 11 percent; and an emulsion stabilizer, 0.1 to 0.35 percent.

As the foregoing formulas strongly suggest, the compositions may well have substantially varying compositions and still accomplish some or all of the stated or even desired goals. Once an appreciation of the accomplishments of the general scheme of formulation has been achieved, slight variations can be made to the emulsions for particular purposes. The different conditions can include the nature of the surfaces undergoing treatment, the specific meteorological conditions where the waxing compositions may find use, and any unusual abusive factors that the treated surface may encounter, such as blowing sand and the like. Nonetheless, the overall nature of the waxing emulsions remain substantially the same.

Adding other components may enhance various properties of the mixtures. These can include fragrances and stabilizers. An even more sophisticated waxing mixture may utilize a triple or greater phase emulsion using, for example, a water-in-oil phase in a water emulsion.

The mixtures achieving beneficial results may generally include the following components in the stated ranges:

1. A water based waxing mixture for treating surfaces comprising an emulsion of an organic phase in an aqueous phase;
   (A) the aqueous phase having:
      (1) water comprising about 70 to 82 percent of the mixture; and
      (2) a surfactant comprising about 2 to 9 percent of the mixture; and
   (B) the organic phase having:
      (1) a wax suspended in the organic phase comprising about 8 to 12.5 percent of the mixture;
      (2) a softening agent in an amount comprising about 0.5 to 4 percent of the mixture; and
      (3) a silicone liquid in an amount comprising Dot more than, about 10 percent of the mixture.

2. A water based waxing mixture for treating surfaces comprising an organic phase in a aqueous phase emulsion;
   (A) the aqueous phase having:
      (1) water comprising about 70 to 92 percent of the mixture;
      (2) a suspending agent comprising about 0.1 to 0.65 percent of the mixture; and
      (3) a surfactant comprising about 1 to 9 percent of the mixture; and
   (B) the organic phase having:
      (1) a wax suspended in the organic phase comprising about 2 to 20 percent of the mixture;
      (2) a softening agent comprising about 0.3 to 4 percent of the mixture;
      (3) a silicone liquid comprising about 1 to 10 percent of the mixture; and
      (4) an emulsion stabilizer comprising about 0.2 to 1 percent of the mixture.

3. A water based waxing mixture for treating surfaces comprising an organic phase in a aqueous phase emulsion,
   (A) the aqueous phase having:
      (1) water comprising about 70 to 92 percent of the mixture;
      (2) a suspending agent comprising about 0.1 to 0.7 percent of the mixture; and
      (3) a surfactant comprising about 2 to 9 percent of the mixture; and
   (B) the organic phase having:
      (1) a wax suspended in the organic phase comprising about 2.5 to 20 percent of the mixture;
      (2) a softening agent comprising about 0.3 to 4 percent of the mixture;
      (3) a silicone liquid comprising about 1 to 2 percent of the mixture; and
   (4) an emulsion stabilizer comprising about 0.2 to 0.3 percent of the mixture.

4. A water based waxing mixture for treating surfaces comprising an organic phase in a aqueous phase emulsion,
   (A) the aqueous phase having:
      (1) water comprising about 71 to 87 percent of the mixture;
      (2) a suspending agent in the range comprising about 0.1 percent to 0.7 percent of the mixture; and
      (3) a surfactant comprising about 1.5 to 12 percent of the mixture; and
   (B) the organic phase having:
      (1) a wax suspended in the organic phase comprising about 2 to 6 percent of the mixture,
      (2) a softening agent comprising about 0.3 to 1 percent of the mixture and in an amount sufficient to soften the wax;
      (3) a silicone liquid comprising about 0.5 to 11 percent of the mixture;
      (4) a preservative comprising about 0.1 to 0.5 percent of the mixture; and
      (5) an emulsion stabilizer comprising about 0.1 to 0.35 percent of the mixture.

5. A waxing mixture comprising an emulsion of an organic phase dispersed in an aqueous phase and a stabilizer in said dispersion,
   (A) said aqueous phase comprising about 70 to 90 percent of said mixture and
   (B) said organic phase comprising about 10 to 30 percent of said mixture and including (1) a wax and (2) a softening agent of a long-chain fatty alcohol ester for said wax.

DETAILED DESCRIPTION

A multiphase oil-in-water emulsion can clean and wax almost all surfaces, especially on an automobile, generally without regard to weather conditions, such as sunlight, high temperature or humidity, or even rain. VOC's and other pollutants do not appear in appreciable amounts in the mixture which thus avoids the heath and safety problems of many currently available products. The surface need not undergo an initial cleaning before the waxing. The mixture provides a one-step cleaner and waxer, applied once and buffed off.

On a molecular level, the waxing mixture facilitates ionic exchanges. The positively charged dirt particles become entrained into the aqueous phase of the mixture. Thus, the dirt is ionically attracted off the surface while the wax within the mixture attaches to the uncharged, now "clean" surface. The waxed surface then presents a nonpolar coating. As a consequence, the zero charged painted and now waxed surface actually resists dirt by providing a barrier to the positively charged dirt particles. The nonpolar coating stays on the waxed surface for an indefinite period. As long as the nonpolar coating remains, dirt is repelled, and the surface stays waxed and clean. This is unlike many waxes that can actually attract dirt. The barrier created by the nonpolar coating lasts as long as the wax remains on the surface. Under ordinary conditions, this may well last for several months.

In order to accomplish the above ion exchange, the mixture uses an emulsion of two or more phases. The emulsion mixture places the nonionic materials, including the wax, from the organic phase into the polar solvent, typically water, of the aqueous phase. Deionized water as the solvent in the aqueous phase provides the most neutral ionic behavior and accordingly represents a highly desired choice. The water content by weight ranges from about 70 percent to about 90 percent of the total mixture.

The aqueous phase, the organic phase, or both (or all phases in the vase of triple emulsions or greater) can also contain emulsifying agents and surfactants. A nonionic surfactant typically takes the form of a long-chain fatty alcohol and may amount as much as 10-percent of the mixture. Examples of this type of surfactant include cetyl, stearyl alcohol, ethoxylated fatty alcohol, cetyl palmitate, cetyl myristate, polyethylene glycol stearate, glyceryl monostearate, monolactate, monooleates, tallow triglycerides and ethoxylated esters. Polyoxyethylene sorbitan monooleate, alkyl glucosinates, and polyoxyethylene nonylphenol represent suitable ethoxylated esters. Specific examples of alcohol surfactants are ethoxylated stearyl alcohol, 20 moles ethoxylated stearyl alcohol, ethoxylated cetyl alcohol, and 20 moles ethoxylated cetyl alcohol. Nonionic surfactants typically work the best in these formulations, though not always so. Other surfactants that can perform satisfactorily are amphoteric surfactants, zwitterionic surfactants and betaines such as cetyl betaine, lauryl or cocamidopropyl betaine. In general terms, a surfactant, when present, may constitute about 1.5 to 12 percent of the mixture.

Small amounts of cationic surfactants may yield some antistatic properties. However, excessive amounts may destabilize the emulsion. Zwitterions, mentioned above, act as mildly charged surfactants. These moiteies have a charge-paired state or do not have their ionic charges situated as the head or tail groups and behave quite well in the emulsions.

The secondary, or organic, phase or phases, include the wax or waxes in liquid suspension for coating the involved surfaces. Typically, this phase also carries various combinations of softening agents, long chain esters, gylcerides, spreading agents, gloss-shine enhancers, emulsifiers and surfactants.

The waxes used in the invention can take the form of natural organic waxes, synthetic organic waxes, and silicone waxes. In particular, they may include esters of high molecular weight carboxylic acids and higher molecular weight alcohols, paraffinic waxes, hydrocarbon waxes, natural plant waxes, and synthetic waxes. The natural waxes are beeswax, spermaceti, hydrogenated castor oil wax and hydrogenated oils. Plant waxes include candellila, carnauba, orange-peel wax, japan wax, montan wax and bayberry wax, many of which are supplied by Koster Keunen® or others.

Synthetic waxes can provide a durable, protective coating that can equal or exceed the protection of the natural materials. The former include petroleum-derived and other synthetic materials such as ceresine, ozokerite, paraffin, microcrystalline, polyethylene waxes, Fischer-Tropsch waxes, fluorocarbons and silicones such as dimethiconol hydroxystearate.

Synthetic waxes can also be simple polydimethyl siloxanes of about 350 centipoise viscosity, phenyl substituted, quaternary silicone liquid preemulsions, or cyclomethicones. Petroleum and synthetic waxes also aid in drying speed and final finish durability. The higher melting temperature Fischer-Tropsch (or, synthetic paraffin) waxes increase the processing temperature of the organic phase ingredients. This may cause problems with the lower melting point natural waxes in terms of thermal degradation. Thus, care should be exercised to avoid scorching lower melting wax ingredients when used in conjunction with those that melt at higher melting synthetic components.

The organic phase, as well as the aqueous phase, may include suspending agents, gelants, and thickening agents. These suspending agents come in both organic and inorganic forms. The inorganic suspending or thickening agents may be hydroxymethylcelluose, guar gum, carageenen, and magnesium aluminum silicates. The organic suspending or thickening agents have a starch base which may be derived from corn, wheat, rice, manioc/topioca, and oat flour. Cellulose also provides another source for suspending agents and can take the form of modified cellulose such as hydroxyethylcellulose. Still other sources of suspending agents are polyethylene glycols of various molecular weights and modifications, polysaccharides, barley beta glucan, polymeric resins, hydroxypolyesters and gums such as xanthan and locust bean gum. Additional inorganic thickeners are clays, zeolites, fumed silica, and silica gel. Workability presents a concern with the waxes, especially those of high molecular weight. However, the inclusion of softeners in the organic phase aids in the application, workability, and performance of the waxes. The addition of a softening agent to the waxes facilitates the emulsification process of dispersing the organic phase. It also appears to aid in the blending of the organic-phase ingredients during melting.

Softening agents are primarily long chain fatty alcohol esters such as isopropyl palmitate and isopropyl myristate. They should be used in an amount sufficient to soften the specific waxes included in the mixture.

The mixtures may also include spreading agents and gloss enhancers, typically silicone liquids of varying molecular weights and substitutions. Simple emulsions without spreading agents prove functional, but seem tackier before mechanical buffing. Silicone liquids improve the workability of the emulsions At low levels, the silicones do not adversely affect the drying of the surface before mechanical buffing. The silicones can also yield a more durable finish than plant and natural waxes alone. Formulations of silicon liquids include Dow Corning 350® silicone liquid, or polydimethyl siloxane, Dow Corning 556® silicone liquid, or phenyl trimethicone. Dow Corning® cyclomethicone silicone liquid and Dow Corning 929® cationic emulsion, a 35 percent cationic emulsion of an amine-functional silicone polymer. The silicone liquid in the organic phase may generally amount to no more than about 10 percent by weight of the mixture.

Other ingredients, such as fragrances and preservatives, added to the final emulsion, can also improve its properties. A fragrance, added in quantities of 0.5 to 2 percent, by weight, creates an increase in aesthetic appeal.

Further, a preservative, in an amount of about 0.1 to 0.3 percent or generally not more than about 0.45 percent, controls microbial growth. Preservatives are strongly indicated for emulsions containing natural or plant waxes in order to avoid microbial degradation after two to three months of repeated use. Low levels of methyl parabens or a formaldehyde donor such as DMDM hydantoin can extend the shelf life to greater than 18 months of repeated use. Triethanolamine is one of the ethanolamines ((HOCH$_2$CH$_2$)3N), which assist in producing a stable emulsions of oils and waxes in water.

EXAMPLES

Tables 1 to 4, below, give formulations of various wax emulsions for polishing surfaces. The groups in the tables provide approximate limits for mixtures with acceptable stability as well as performance. Liquid stability constitute an important consideration for water-and-oil mixtures to prevent separation, floculance, and demulsifiction. The four example groups in the tables demonstrate the range of ingredient percentages which can give obtain acceptable performance and ease of use. The formulations with higher carnuaba wax contents require greater amounts of the softening agent isopropyl plamitate.

Each of the four example groups below demonstrate a functional type of mixture. Thus, Example Group 1 gives examples of mixtures with surfactants; Example Group 2 demonstrates mixtures with both suspending agents and surfactants; Example Group 3 strives for maximum wax content,—the "superwax" group; and Example Group 4 presents mixtures with low water content. The tables below list all of the components of the various mixtures.

Example Group 1

Example Group 1 represents compositions using surfactants as the emulsifying agent or agents. The formulations of this group, though containing good performing water/softener/water/emulsifier ratios, display a relatively low viscosity and, thus, to avoid demulsification after several months' storage may require greater emulsion stability.

TABLE 1

| Example Group 1 Content | Wt. PERCENT Range |
|---|---|
| Water | 70.0–82.0 |
| 20 moles ethoxylated stearyl alcohol | 2.0–6.5 |
| Isopropyl palmitate | 0.5–3.5 |
| Carnauba wax - Koster Keunen ®, etc. | 8.0–12.5 |
| Dow Corning 350 ® silicone liquid | 0.0–3.0 |
| Dow Corning 556 ® silicone liquid | 0.0–1.5 |

In Example 1a, the aqueous phase contains ethoxylated stearyl alcohol as the emulsifying agent. Although the emulsion forms readily, it proves less stabile in maintaining the emulsion state. This embodiment uses a silicon liquid, carnauba wax, alcohol and water. It represent a formulation employing higher water and wax percentages. High wax content compositions permit a single application on painted metals. These painted surfaces are often found on older model cars. Those paint surfaces on these cars have typically experienced high levels of oxidation which require the protection provided by a higher wax content. In the following examples, Brij 78 refers to the compound polyoxyethylene (20) stearyl ether.

Example 1a

| Ingredient | Wt. percent |
|---|---|
| Water | 81 |
| 20 moles ethoxylated Stearyl Alcohol—ICI BRIJ-78 | 5.4 |
| Isopropyl palmitate | 2.2 |
| Carnauba wax - Koster Keunen, etc. | 10.9 |
| Dow Corning 350 silicone liquid | 0.5 |
| Total | 100 |

Example 1b provides a sturdier wax content than Example 1a. In this wax mixture, the water phase contains emulsifying agents composed of ethoxylated stearyl alcohol. The formulation decreases the water content in favor of a higher wax content. The heartier wax content produces a more favorable durable shine without sacrificing a high ratio of wax/softening agent to water/emulsifier. However, the higher wax content makes buffing more difficult because it leaves a thicker wax film residue.

Example 1b

| Ingredient | Wt. percent |
|---|---|
| Water | 78.5 |
| 20 moles ethoxylated Stearyl Alcohol—ICI BRIJ-78 | 5 |
| Isopropyl palmitate | 3 |
| Carnauba wax - Koster Keunen, etc. | 12.5 |
| Dow Corning 350 silicone liquid | 1 |
| Total | 100 |

Example 1c increases the wax's spreadability and ease of buffing. Repetitions of freezing and thawing conditions result in premature wax breakdown. This problem occurs commonly in wax formulations. However, adding silicone liquids provides greater resistance to the ravishes of freeze-thaw cycles. Both phases of this formulation contain emulsifying agents composed of ethoxylated stearyl alcohol split evenly between them. Mixing progressively more of Dow Corning 350® silicon liquid and carnauba wax attains this embodiment. Pleasantly, Dow Corning 350® represents one of the least expensive silicon liquids available.

Example 1c

| Ingredient | Wt. percent |
|---|---|
| Water | 77 |
| 20 moles ethoxylated Stearyl Alcohol—ICI BRIJ-78 | 5 |
| Isopropyl palmitate | 3 |
| Carnauba wax - Koster Keunen, etc. | 12.0 |
| Dow Corning 350 silicone liquid | 3 |
| Total | 100 |

The formulation of Example 1d achieves good spreadability with increased ease of buffing and improved shine. Further, incorporating Dow Corning 556 silicon liquid in equal amounts with Dow Corning 350 will produce a mixture with increased shine. Dow Corning 556 silicon liquid is more expensive but has a higher refractive index which increases the perception of shininess.

Example 1d

| Ingredient | Wt. percent |
| --- | --- |
| Water | 76.5 |
| 20 moles ethoxylated Stearyl Alcohol—ICI BRIJ-78 | 6.5 |
| Isopropyl palmitate | 3.5 |
| Carnauba wax - Koster Keunen, etc. | 10.5 |
| Dow Corning 350 silicone liquid | 1.5 |
| Dow Corning 556 silicone liquid | 1.5 |
| Total | 100 |

Example Group 2

Example Group 2 represents compositions with suspending agents and surfactants. The range of ingredients used in Example Group 2 appear in Table 2. Example Group 2 uses both suspending agents and variations in silicon liquid content to create a lighter but sturdier wax. Veegum, Carbopol 934®, or Ultrez® act as the suspending agent(s). These suspending agents serve to stabilize the emulsion. In these and the following examples, the ingredient listed as ICI-Tween 80 refers to polyoxyethylene (20) sorbitan monooleate.

TABLE 2

| Example Group 2 Content | Wt. PERCENT Range |
| --- | --- |
| Water | 70.0–90.0 |
| BFGoodrich Carbopol 934 | 0.0–0.3 |
| Magnesium Aluminum Silicate-Vanderbilt Veegum | 0.0–0.35 |
| BF Goodrich Ultrez | 0.0–0.3 |
| ICI—Tween 80 | 0.0–1.0 |
| Nonoxynol 9 | 0.0–1.5 |
| 20 moles ethoxylated Stearyl Alcohol—ICI BRIJ-78 | 0.0–3.5 |
| 20 moles ethoxylated Cetyl Alcohol | 0.0–3.0 |
| Isopropyl palmitate | 0.3–4.0 |
| Carnauba wax - Koster Keunen, etc. | 2.0–12.5 |
| Dow Corning 350 silicone liquid | 0.5–3.0 |
| Dow Corning 556 silicone liquid | 0.5–3.0 |
| Dow Corning cyclomethicone silicone liquid | 0.0–1.0 |
| Dow Corning 929 cationic emulsion | 0.0–3.0 |
| DMDM Hydantion - McIntyre | 0.0–0.45 |
| Triethanolamine | 0.2–1.0 |

Example Group 2 relies on combinations of liquid-silicon fluids with carnauba wax. Specifically, Example 2a represents the largest amount of water, by weight, in this group while still maintaining the requisite stability.

The mixture for Example 2b provides high resistance to freeze-thaw yet reduces the amount of caranuba wax. To accomplish this, this mix increases the amount of liquid silicone. This mix has some cationic agents that, when included, creates antistatic properties, for application of the wax following washing of the vehicle or other surface with traditional anionic detergents as in Example 2b, below.

A further discovery, shown in Examples 2a, 2b and 2c, represents both a cleaner and a wax with high resistance to multiple freeze/thaw cycles. High resistance to freeze/thaw conditions occurs with the use of appropriate amounts and types of suspending agents in combination with caranuba wax and liquid silicone fluids. Further, Example 2b, as well as 2c below, includes a cationic agent, whereas Example 2a does not.

Example 2a

| Ingredient | Wt. percent |
| --- | --- |
| Water | 90 |
| BFGoodrich Carbopol 934 | 0.2 |
| Magnesium Aluminum Silicate-Vanderbilt Veegum | 0.3 |
| 20 moles ethoxylated Stearyl Alcohol—ICI BRIJ-78 | 3.0 |
| Isopropyl palmitate | 0.5 |
| Carnauba wax - Koster Keunen, etc. | 2.75 |
| Dow Corning 350 silicone liquid | 1.5 |
| Dow Corning 556 silicone liquid | 1.5 |
| Triethanolamine | 0.25 |
| Total | 100 |

Example 2b

| Ingredient | Wt. percent |
| --- | --- |
| Water | 87.0 |
| BFGoodrich Carbopol 934 ® | 0.25 |
| Magnesium Aluminum Silicate-Vanderbilt Veegum ® | 0.25 |
| Nonoxynol 9 | 1.5 |
| 20 moles ethoxylated stearyl alcohol—ICI BRIJ-78 ® | 2.7 |
| isopropyl palmitate | 0.50 |
| carnauba wax - Koster Keunen ®, etc. | 2.0 |
| Dow Corning 350 ® silicone liquid | 0.60 |
| Dow Corning 556 ® silicone liquid | 0.50 |
| Dow Corning ® cyclomethicone silicone liquid | 1.0 |
| Dow Corning 929 ® cationic emulsion | 3.0 |
| DMDM Hydantion - McIntyre ® | 0.45 |
| Triethanolamine | 0.25 |
| Total | 100 |

Example 2c

| Ingredient | Wt. percent |
| --- | --- |
| Water | 85.7 |
| BFGoodrich Carbopol 934 ® | 0.25 |
| Magnesium Aluminum Silicate-Vanderbilt Veegum ® | 0.35 |
| ICI—Tween 80 ® | 1.0 |
| 20 moles ethoxylated Cetyl Alcohol | 3.0 |
| Isopropyl palmitate | 0.50 |
| Carnauba wax - Koster Keunen ®, etc. | 4.0 |
| Dow Corning 350 ® silicone liquid | 1.5 |
| Dow Corning 556 ® silicone liquid | 1.5 |
| Dow Corning ® cyclomethicone silicone liquid | 0.5 |
| Dow Corning 929 ® cationic emulsion | 1.5 |
| Triethanolamine | 0.2 |
| Total | 100 |

Example Group 3

TABLE 3

| Example Group 3 Content | Wt. PERCENT Range |
|---|---|
| Water | 70–92 |
| BFGoodrich Carbopol 934 | 0.0–0.35 |
| Magnesium Aluminum Silicate - Vanderbilt Veegum | 0.0–0.35 |
| BFGoodrich Ultrez | 0.0–0.3 |
| 20 moles ethoxylated Stearyl Alcohol—ICI BRIJ-78 | 0.0–3.5 |
| 20 moles ethoxylated Cetyl Alcohol | 0.0–3.5 |
| Cetyl/Stearyl Alcohols - Various Manufacturers | 0.0–2.0 |
| Isopropyl palmitate | 0.3–4.0 |
| Carnauba wax - Koster Keunen, etc. | 1.0–12.0 |
| Microcrystalline wax - Koster Keunen, etc. | 0.5–1.2 |
| Orange peel wax - Koster Keunen, etc. | 0.25–0.75 |
| Dimethiconol Hydroxystearate - Silpak Silwax C | 0.1–0.3 |
| Candelilla Wax - Koster Keunen, etc. | 0.7–6.0 |
| Dow Corning 350 silicone liquid | 1.0–2.0 |
| Triethanolamine | 0.2–0.3 | reason, they are referred to as the "super-wax" group. This group may employ a large variety of synthetic and plant-derived waxes used with silicone wax and silicone liquids. The formulations introduce a variety of natural waxes that increase the cleansing action of the final mixtures. Orange-peel wax provides a good example of a plant-derived wax. Orange peel wax has the added bonus of a significant "orange" fragrance as well as its cleansing properties.

Example 3a presents the highest water content of the heavy wax group. The water content decreases the cost and results in the least expensive heavy-wax formulation. The cleaning action of the wax in suspension remains unaffected by the high water content because of the increased reliance on suspending agents and surfactants. The silicone liquid complements. the wax while providing for a smooth consistency, necessary for enhanced surface application. The triethanolamine in this mixture aids in the suspending properties of the emulsion by creating a gel in combination with the Carbopol. This is also true for the waxes of Example Groups 2, 3, 4 that employ triethanolamine in combination with Carbopol, as here, or Ultrez.

Example 3a

| Ingredients | Wt. percent |
|---|---|
| Water | 92 |
| BEGoodrich Carbopol 934 | 0.2 |
| Magnesium Aluminum Silicate - Vanderbilt Veegum | 0.35 |
| 20 moles ethoxylated Stearyl Alcohol—ICI BRIJ-78 | 2.5 |
| Isopropyl palmitate | 0.3 |
| Carnauba wax - Koster Keunen, etc. | 1.35 |
| Microcrystalline wax - Koster Keunen, etc. | 0.6 |
| Orange peel wax - Koster Keunen, etc. | 0.25 |
| Dimethiconol Hydroxystearate - Silpak Silwax C | 0.2 |
| Candelilla Wax - Koster Keunen, etc. | 0.7 |
| Dow Corning 350 silicone liquid | 1.35 |
| Triethanolamine | 0.2 |
| Total | 100 |

Example 3b demonstrates the mid-range water content mixes of the heavy-wax group. It contains a greater amount of wax is in suspension which allows for a thicker application of wax while remaining a cost-effective. This formula proves especially effective on glossy, metallic and multicoat automotive paint finishes employing a clear coat as the final layer. The formulation works well on glass and rubber surfaces without leaving a wax residue.

Example 3b

| Ingredients | Wt. percent |
|---|---|
| Water | 85.95 |
| Magnesium Aluminum Silicate - Vanderbilt Veegum | 0.15 |
| BFGoodrich Ultrez | 0.2 |
| 20 moles ethoxylated Stearyl Alcohol—ICI BRIJ-78 | 3.5 |
| Cetyl/Stearyl Alcohols - Various Manufacturers | 1 |
| Isopropyl palmitate | 0.8 |
| Carnauba wax - Koster Keunen, etc. | 3.35 |
| Microcrystalline wax - Koster Keunen, etc. | 0.8 |
| Orange peel wax - Koster Keunen, etc. | 0.75 |
| Dimethiconol Hydroxystearate - Silpak Silwax C | 0.2 |
| Candelilla Wax - Koster Keunen, etc. | 1.7 |
| Dow Corning 350 silicone liquid | 1.35 |
| Triethanolamine | 0.2 |
| Total | 100 |

Example 3c shows a low-water alternative. At a water content of 70 percent by weight.

Example 3c

| Ingredients | Wt. percent |
|---|---|
| Water | 70 |
| BFGoodrich Ultrez | 0.15 |
| 20 moles ethoxylated Stearyl Alcohol—ICI BRIJ-78 | 2 |
| 20 moles ethoxylated Cetyl Alcohol | 2 |
| Isopropyl palmitate | 4 |
| Carnauba wax - Koster Keunen, etc. | 12 |
| Microcrystalline wax - Koster Keunen, etc. | 1.2 |
| Orange peel wax - Koster Keunen, etc. | 0.5 |
| Dimethiconol Hydroxystearate - Silpak Silwax C | 0.3 |
| Candelilla Wax - Koster Keunen, etc. | 6 |
| Dow Corning 350 silicone liquid | 1.65 |
| Triethanolamine | 0.2 |
| Total | 100 |

This formulation demonstrates the variety of mixtures that can find use. This variation, with the heaviest wax content, still manages to apply smoothly across a surface and yet possesses a rapid drying time.

Example Group 4

Example Group 4, with content ranges listed in Table 4, represents compositions with a low water content, higher silicone wax content and a number of nonionic surfactants and emulsifiers. Fragrances and preservatives or antimicrobial agents find use in this group as well.

The first low-cost mixture appears in Example 4a. This formulation uses a low water

TABLE 4

| Example Group 4 Content | Wt. PERCENT Range |
|---|---|
| Water | 71.0–87.0 |
| BFGoodrich Carbopol 934 | 0.0–.35 |
| Magnesium Aluminum Silicate - Vanderbilt Veegum | 0.0–0.35 |
| BFGoodrich Ultrez | 0.0–0.3 |
| ICI—Tween 80 | 0.0–1.0 |
| Nonoxynol 9 | 0.0–1.5 |
| 20 moles ethoxylated Stearyl Alcohol—ICI BRIJ-78 | 0.0–3.5 |
| 20 moles ethoxylated Cetyl Alcohol | 0.0–3.5 |

TABLE 4-continued

| Example Group 4 Content | Wt. PERCENT Range |
|---|---|
| Cetyl/Stearyl Alcohols - Various Manufacturers | 0.0–2.0 |
| Isopropyl palmitate | 0.5–1.0 |
| Carnauba wax - Koster Keunen, etc. | 2.0–6.0 |
| Dow Corning 350 silicone liquid | 0.6–8.0 |
| Dow Corning 556 silicone liquid | 0.5–2.0 |
| Dow Corning cyclomethicone silicone liquid | 0.5–1.0 |
| Dow Corning 929 cationic emulsion | 0.0–3.0 |
| DMDM Hydantion - McIntyre | 0.0–0.45 |
| Methyl paraben | 0.0–0.15 |
| Triethanolamine | 0.1–0.35 |
| Blended fragrance oils - Various Manufacturers | 0.0–1.0 | content while retaining the desired properties of the emulsion. This mixture also uses the highest amounts of nonionic surfactants.

The next low cost alternative appears in Group Example 4b. Example Group 4b uses a higher water content while retaining the properties of the wax emulsions. This example uses large wax and silicone contents and low amounts of surfactants and emulsifiers.

Method of Preparation

Preparing the mixture starts with the creation of the aqueous phase. The aqueous-phase Example 4a

| Ingredients | Wt. percent |
|---|---|
| Water | 71.4 |
| BFGoodrich Ultrez | 0.2 |
| ICI—Tween 80 | 0.5 |
| Nonoxynol 9 | 0.5 |
| 20 moles ethoxylated Stearyl Alcohol—ICI BRIJ-78 | 3.5 |
| 20 moles ethoxylated Cetyl Alcohol | 3.5 |
| Cetyl/Stearyl Alcohols - Various Manufacturers | 2 |
| Isopropyl palmitate | 1 |
| Carnauba wax - Koster Keunen, etc. | 5 |
| Dow Corning 350 silicone liquid | 8 |
| Dow Corning 556 silicone liquid | 2 |
| Dow Corning cyclomethicone silicone liquid | 1 |
| DMDM Hydantion - McIntyre | 0.2 |
| Triethanolamine | 0.2 |
| Blended fragrance oils - Various Manufacturers | 1 |
| Total | 100 |

Example 4b

| Ingredients | Wt. percent |
|---|---|
| Water | 82.1 |
| BFGoodrich Carbopol 934 ® | 0.25 |
| Magnesium Aluminum Silicate - Vanderbilt Veegum ® | 0.25 |
| Nonoxynol 9 | 1.5 |
| 20 moles ethoxylated stearyl alcohol—ICI BRIJ-78 | 2.7 |
| Isopropyl palmitate | 0.5 |
| Carnauba wax - Koster Keunen ®, etc. | 6 |
| Dow Corning 350 ® silicone liquid | 0.6 |
| Dow Corning 556 ® silicone liquid | 0.5 |
| Dow Corning cyclomethicone silicone liquid | 1 |
| Dow Corning 929↓ cationic emulsion | 3 |
| DMDM Hydantion - McIntyre ® | 0.2 |
| Methyl paraben | 0.15 |

-continued

| Ingredients | Wt. percent |
|---|---|
| Triethanolamine | 0.25 |
| Blended fragrance oils - Various Manufacturers | 1 |
| Total | 100 | ingredients are combined and stirred while heated to about 120° F. until the powdered ingredients are thoroughly dissolved or dispersed. Separately, the organic-phase ingredients are combined and stirred while heating to about 160–185° F. Naturally, the temperature varies depending upon the melting point of waxes used. Other ingredients, such as fragrances and antimicrobial agents, may be added either this time. Alternately, ingredients, especially thermally unstable components, may join the mixture immediately preceding the cooling.

Emulsifying agents can be added to either phase at the beginning of its preparation. This depends on the contents of each phase, but both the water and organic phases benefit from the addition of emulsifiers. Suspending agents will disperse better with aqueous-phase emulsifiers. Further, suspending agents give a more stable emulsion during the subsequent cooling of the preparation. The decrease of wax with the increase of emulsifier creates a stable emulsion that, when applied to the surface, creates a more lustrous shine.

As stated, the organic phase will likewise benefit from the introduction of emulsifying agents at the beginning of its preparation. The degree of effect depends on the wax content. Heavy wax formulations will become more stabile with an emulsifying agent. Triethanolamine, when added to the emulsion, forms a Carbopol gel, which in turn provides for greater and longer-term emulsion stability.

After preparing the two separate phases, the aqueous phase temperature increases to 160° F. At this point, the stirring increases and the organic phase is slowly added to form the emulsion. After completing the addition of the organic phase, the emulsion slowly cools with low-speed mixing.

In addition to the methods described above, almost any procedure of combining the oil- and water-phase ingredients to form a stable emulsion may find use in creating the wax mixtures referenced above. This, in particular may include ultrasonic emulsification, high-shear colloid milling, continuous flow-feed, high-pressure homogenization, membrane emulsification, low-energy emulsification, cold emulsification, and microemulsification. Other techniques may prove feasible and desirable as well.

Accordingly, what is claimed is:

1. A water based waxing mixture for treating surfaces comprising an emulsion of an organic phase in an aqueous phase;

(A) said aqueous phase having:
  (1) water comprising about 70 to 82 percent of said mixture; and
  (2) a surfactant comprising about 2 to 9 percent of said mixture; and
 (B) said organic phase having:
  (1) a wax suspended in said organic phase comprising about 8 to 12.5 percent of said mixture;
  (2) a softening agent in an amount comprising about 0.5 to 4 percent of said mixture; and
  (3) a silicone liquid in an amount comprising not more than about 10 percent of said mixture.

2. The mixture of claim 1 wherein said surfactant is a cetyl alcohol or a stearyl alcohol.

3. The mixture of claim 2 wherein said surfactant is 20-mole ethoxylated stearyl alcohol.

4. The mixture of claim 1 wherein said wax is carnauba wax.

5. The mixture of claim 1 wherein said softening agent is isopropyl palmitate.

6. The mixture of claim 1 wherein said silicone liquid is polydimethyl siloxane.

7. The mixture of claim 1 wherein said water is deionized water.

8. A water based waxing mixture for treating surfaces comprising an organic phase in a aqueous phase emulsion;
(A) said aqueous phase having:
(1) water comprising about 70 to 92 percent of said mixture;
(2) a suspending agent comprising about 0.1 to 0.65 percent of said mixture; and
(3) a surfactant comprising about 1 to 9 percent of said mixture; and
(B) said organic phase having:
(1) a wax suspended in said organic phase comprising about 2 to 20 percent of said mixture;
(2) a softening agent comprising about 0.3 to 4 percent of said mixture;
(3) a silicone liquid comprising about 1 to 10 percent of said mixture; and
(4) an emulsion stabilizer comprising about 0.2 to 1 percent of said mixture.

9. The mixture of claim 8 wherein said suspending agent is selected from the group consisting of carbomer and magnesium aluminum silicate.

10. The mixture of claim 8 wherein said surfactant is a cetyl alcohol or a stearyl alcohol.

11. The mixture of claim 10 wherein said surfactant is 20-mole ethoxylated stearyl alcohol.

12. The mixture of claim 11 wherein said surfactant is selected from the group consisting of polyoxyethylene (20) sorbitan monooleate, nonoxynol 9, 20-mole ethoxylated stearyl alcohol, and 20-mole ethoxylated cetyl alcohol.

13. The mixture of claim 8 wherein said wax is carnauba wax.

14. The mixture of claim 8 wherein said softening agent is isopropyl palmitate.

15. The mixture of claim 8 wherein said silicone liquid is selected from the group consisting of polydimethyl siloxane, phenyl trimethicone, and cyclomethicone silicon liquid.

16. The mixture of claim 8 wherein said emulsion stabilizer is triethanolamine.

17. The mixture of claim 8 wherein said water is about 70 to 90 percent of said mixture.

18. The mixture of claim 8 further including, in said organic phase a cationic emulsion comprising about 0 to 3 percent of said mixture.

19. The mixture of claim 18 wherein said suspending agent is selected from the group consisting of carbomer and magnesium aluminum silicate.

20. The mixture of claim 18 wherein said surfactant is a cetyl alcohol or a stearyl alcohol.

21. The mixture of claim 20 wherein said surfactant is 20-mole ethoxylated stearyl alcohol.

22. The mixture of claim 18 wherein said surfactant is selected from the group consisting of polyoxyethylene (20) sorbitan monooleate, nonoxynol 9, 20-mole ethoxylated stearyl alcohol, and 20-mole ethoxylated cetyl alcohol.

23. The mixture of claim 18 wherein said wax is carnauba wax.

24. The mixture of claim 18 wherein said softening agent is isopropyl palmitate.

25. The mixture of claim 18 wherein said silicone liquid is selected from the group consisting of polydimethyl siloxane, phenyl trimethicone and cyclomethicone silicon liquid.

26. The mixture of claim 18 wherein said cationic emulsion is a 35 percent cationic emulsion of an amine-functional silicone polymer.

27. The mixture of claim 18 wherein said emulsion stabilizer is triethanolamine.

28. The mixture of claim 18 wherein said water is deionized water.

29. The mixture of claim 8 further including, in said organic phase, a preservative comprising not more than about 0.45 percent of said mixture.

30. The mixture of claim 29 wherein said suspending agent is selected from the group consisting of carbomer and magnesium aluminum silicate.

31. The mixture of claim 29 wherein said surfactant is a cetyl alcohol or a stearyl alcohol.

32. The mixture of claim 31 wherein said surfactant is 20-mole ethoxylated stearyl alcohol.

33. The mixture of claim 32 wherein said surfactant is selected from the group consisting of polyoxyethylene (20) sorbitan monooleate, nonoxynol 9, 20-mole ethoxylated stearyl alcohol, and 20-mole ethoxylated cetyl alcohol.

34. The mixture of claim 29 wherein said wax is carnauba wax.

35. The mixture of claim 29 wherein said softening agent is isopropyl palmitate.

36. The mixture of claim 29 wherein said silicone liquid is selected from the group consisting of polydimethyl siloxane, phenyl trimethicone and cyclomethicone silicon liquid.

37. The mixture of claim 29 wherein said cationic emulsion is a 35 percent cationic emulsion of an amine-functional silicone polymer.

38. The mixture of claim 29 wherein said preservative is selected from the group consisting of DMDM hydantoin and methyl paraben.

39. The mixture of claim 29 wherein said emulsion stabilizer is triethanolamine.

40. The mixture of claim 29 wherein said water is deionized water.

41. A water based waxing mixture for treating surfaces comprising an organic phase in a aqueous phase emulsion,
(A) said aqueous phase having:
(1) water comprising about 70 to 92 percent of said mixture;
(2) a suspending agent comprising about 0.1 to 0.7 percent of said mixture; and
(3) a surfactant comprising about 2 to 9 percent of said mixture; and
(B) said organic phase having:
(1) a wax suspended in said organic phase comprising about 2.5 to 20 percent of said mixture;
(2) a softening agent comprising about 0.3 to 4 percent of said mixture;
(3) a silicone liquid comprising about 1 to 2 percent of said mixture; and
(4) an emulsion stabilizer comprising about 0.2 to 0.3 percent of said mixture.

42. The mixture of claim 41 wherein said suspending agent is selected from the group consisting of carbomer and magnesium aluminum silicate.

43. The mixture of claim 41 wherein said surfactant is a cetyl alcohol or a stearyl alcohol.

44. The mixture of claim 43 wherein said surfactant is 20-mole ethoxylated stearyl alcohol.

45. The mixture of claim 44 wherein said surfactant is selected from the group consisting of polyoxyethylene (20) sorbitan monooleate, nonoxynol 9, 20-mole ethoxylated stearyl alcohol, 20-mole ethoxylated cetyl alcohol, cetyl alcohol, and stearyl alcohol.

46. The mixture of claim 41 wherein said wax is selected from the group consisting of carnauba wax, microcrystalline wax, orange peel wax, dimethiconol hydroxystearate wax and candelilla wax.

47. The mixture of claim 41 wherein said softening agent is isopropyl palmitate.

48. The mixture of claim 41 wherein said silicone liquid is selected from the group consisting of polydimethyl siloxane, phenyl trimethicone and cyclomethicone silicon liquid.

49. The mixture of claim 41 wherein said emulsion stabilizer is triethanolamine.

50. The mixture of claim 41 wherein said water is deionized water.

51. The mixture of claim 41 wherein said a softening agent consitutes at least about 0.8 percent of said mixture.

52. The mixture of claim 51 wherein said softening agent is present in said mixture in an amount sufficient to soften said wax.

53. A water based waxing mixture for treating surfaces comprising an organic phase in a aqueous phase emulsion,
(A) said aqueous phase having:
  (1) water comprising about 71 to 87 percent of said mixture;
  (2) a suspending agent in the range comprising about 0.1 percent to 0.7 percent of said mixture; and
  (3) a surfactant comprising about 1.5 to 12 percent of said mixture; and
(B) said organic phase having:
  (1) a wax suspended in said organic phase comprising about 2 to 6 percent of said mixture,
  (2) a softening agent comprising about 0.3 to 1 percent of said mixture and in an amount sufficient to soften said wax;
  (3) a silicone liquid comprising about 0.5 to 11 percent of said mixture;
  (4) a preservative comprising about 0.1 to 0.5 percent of said mixture; and
  (5) an emulsion stabilizer comprising about 0.1 to 0.35 percent of said mixture.

54. The mixture of claim 53 wherein said suspending agent is selected from the group consisting of carbomer and magnesium aluminum silicate.

55. The mixture of claim 53 wherein said surfactant is a cetyl alcohol or a stearyl alcohol.

56. The mixture of claim 55 wherein said surfactant is 20-mole ethoxylated stearyl alcohol.

57. The mixture of claim 56 wherein said surfactant is selected from the group consisting of polyoxyethylene (20) sorbitan monooleate, nonoxynol 9, 20-mole ethoxylated stearyl alcohol, 20-mole ethoxylated cetyl alcohol, cetyl alcohol, and stearyl alcohol.

58. The mixture of claim 53 wherein said wax is carnauba wax.

59. The mixture of claim 53 wherein said softening agent is isopropyl palmitate.

60. The mixture of claim 53 wherein said silicone liquid is selected from the group consisting of polydimethyl siloxane, liquid phenyl trimethicone and cyclomethicone silicon liquid.

61. The mixture of claim 53 wherein said preservative is selected from the group consisting of DMDM hydantoin and methyl paraben.

62. The mixture of claim 53 wherein said emulsion stabilizer is triethanolamine.

63. The mixture of claim 53 further including a fragrance up to 1 percent of said mixture.

64. The mixture of claim 53 wherein said water is deionized water.

65. The mixture of claim 53 wherein said fragrance is a blended fragrance oil.

66. The mixture of claim 53 wherein said organic phase further includes a cationic emulsion up to 3 percent of said mixture.

67. The mixture of claim 66 wherein said suspending agent is selected from the group consisting of carbomer and magnesium aluminum silicate.

68. The mixture of claim 66 wherein said surfactant is a cetyl alcohol or a stearyl alcohol.

69. The mixture of claim 68 wherein said surfactant is 20-mole ethoxylated stearyl alcohol.

70. The mixture of claim 69 wherein said surfactant is selected from the group consisting of polyoxyethylene (20) sorbitan monooleate, nonoxynol 9, 20-mole ethoxylated stearyl alcohol, 20-mole ethoxylated cetyl alcohol, cetyl alcohol, and stearyl alcohol.

71. The mixture of claim 66 wherein said wax is carnauba wax.

72. The mixture of claim 66 wherein said softening agent is isopropyl palmitate.

73. The mixture of claim 66 wherein said silicone liquid is selected from the group consisting of polydimethyl siloxane, phenyl trimethicone and cyclomethicone silicon liquid.

74. The mixture of claim 66 wherein said preservative is selected from the group consisting of DMDM hydantoin and methyl paraben.

75. The mixture of claim 66 wherein said emulsion stabilizer is triethanolamine.

76. The mixture of claim 66 wherein said fragrance is a blended fragrance oil.

77. The mixture of claim 66 further including a fragrance up to about 1 percent of said mixture.

78. The mixture of claim 66 wherein said water is deionized water.

79. A waxing mixture comprising an emulsion of an organic phase dispersed in an aqueous phase and a stabilizer in said dispersion,
(A) said aqueous phase comprising about 70 to 90 percent of said mixture and
(B) said organic phase comprising about 10 to 30 percent of said mixture and including (1) a wax and (2) a softening agent of a long-chain fatty alcohol ester for said wax.

80. The mixture of claim 79 wherein said softening agent is present in said organic phase in a quantity sufficient to soften said wax.

81. The mixture of claim 80 further including a surfactant.

82. The mixture of claim 79 wherein said aqueous phase includes at least a portion of said surfactant.

83. The mixture of claim 81 wherein said surfactant comprises about 1.5 to 12 percent of said mixture.

84. The mixture of claim 81 wherein said-softening agent is isopropyl palmitate or isopropyl myristate.

85. The mixture of claim 84 wherein said aqueous phase further includes a suspending agent.

86. The mixture of claim 85 wherein said suspending agent is selected from the group consisting of hydroxymethylcellulose, guar gum, carageenen, and magnesium aluminum silicate.

87. The mixture of claim 86 wherein said wax is a natural organic wax, a synthetic organic wax, or a silicone wax.

88. The mixture of claim 86 wherein said wax comprises about 8 to 20 percent of said mixture.

89. The mixture of claim 88 wherein said softening agent comprises a long-chain ester.

90. The mixture of claim 85 wherein said organic phase further includes a cationic emulsion.

91. The mixture of claim 90 wherein said organic phase further includes a preservative.

92. The mixture of claim 91 further comprising a silicone liquid in said organic phase, said silicone liquid comprising no more than about 10 percent by weight of said mixture.

93. The mixture of claim 88 further comprising a silicone liquid in said organic phase, said silicone liquid comprising no more than about 10 percent by weight of said mixture.

* * * * *